3,796,761
OXIDATION OF HYDROCARBONS TO ALCOHOLS VIA BORATE ESTERS

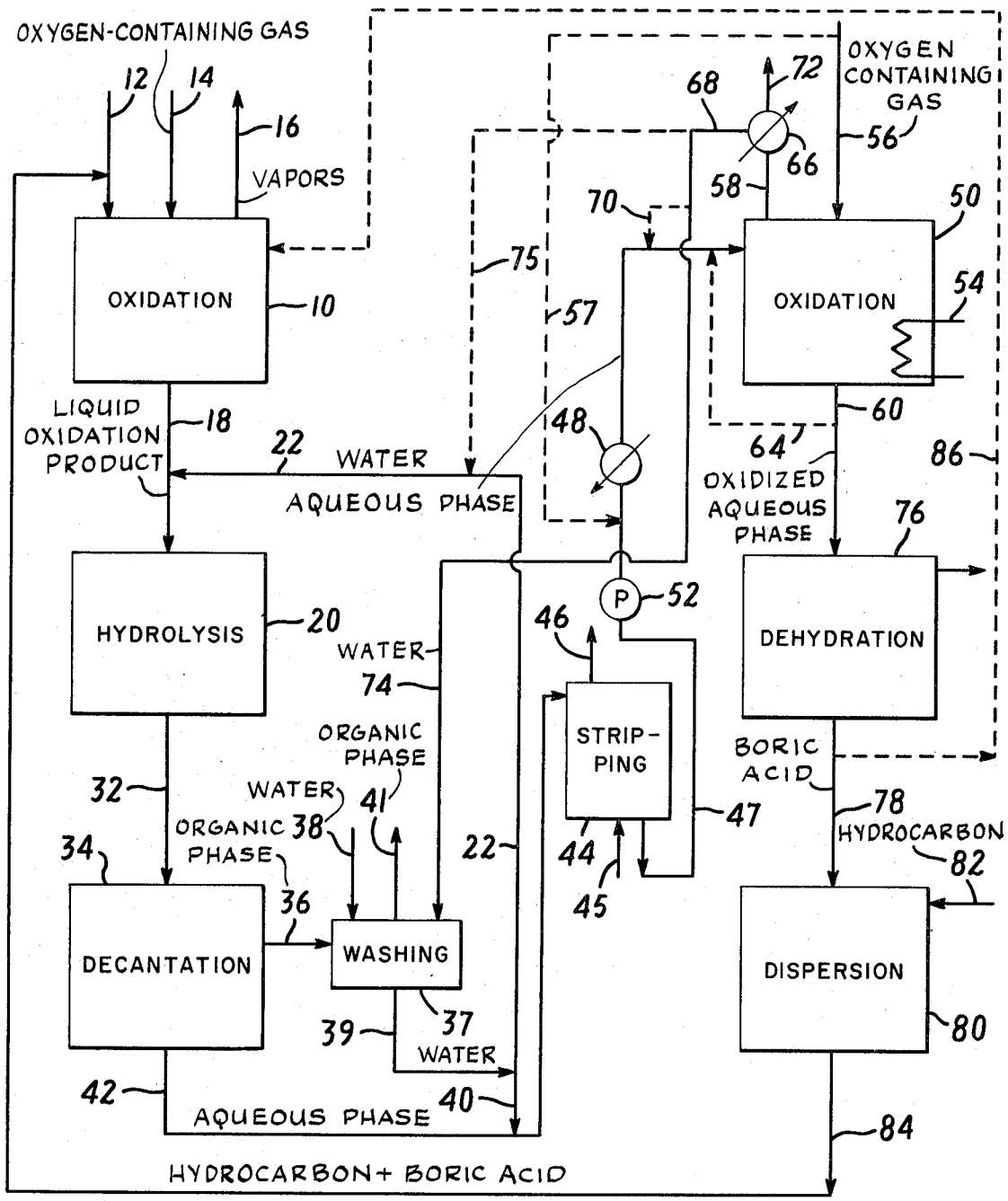

Richard L. Marcell, Bergenfield, N.J., and Tsuan Y. Chang, Baldwin, N.Y., assignors to Halcon International, Inc.
Filed Aug. 18, 1971, Ser. No. 172,702
Int. Cl. C07c 27/12, 31/02, 35/08
U.S. Cl. 260—631 B                    10 Claims

ABSTRACT OF THE DISCLOSURE

In a process for the oxidation of hydrocarbons in the presence of boric acid to form an oxidation product comprising borate esters of the alkanol corresponding to the hydrocarbon oxidized, the oxidation product is hydrolyzed to form an aqueous solution containing substantially all of the boric acid liberated in the hydrolysis reaction, and an organic phase, the aqueous solution is subjected to a second oxidation to remove substantially all organic compounds from it, the boric acid is recovered from the resulting solution by dehydration, and the recovered dehydrated boric acid is returned to the hydrocarbon oxidation reaction.

---

This invention relates to the oxidation of hydrocarbons with molecular oxygen-containing gases in the presence of boron compounds, and it is more particularly concerned with an improved oxidation process wherein the boron compounds may be efficiently and effectively recovered and reused, and effluent waste materials, particularly organic wastes, are reduced to a minimum.

It is well known that hydrocarbons can be directly oxidized with molecular oxygen-containing gases to produce oxygenated organic derivatives of recognized commercial importance. It is also known that boron compounds, which esterify with alcohols formed during the oxidation, are advantageously employed in such oxidation as adjuvants to provide improved selectivity in the conversion of such hydrocarbons to the desired products, most commonly the monofunctional alcohol and ketone derivatives of the hydrocarbon being oxidized. Such processes are disclosed, for example, in Winnick, U.S. Pat. No. 3,243,449.

In the commercial practice of processes of this type, it is readily apparent that, for these processes to be economically attractive, the boron values must be recovered and recycled to the oxidation. However, while such operation might appear to be a simple matter, in practice it presents many problems and requires special techniques in order for the recycling to be realized without adverse effect upon the efficiency of the oxidation, particularly with respect to selectivity and conversion with a given amount of oxygen. If, for example, the boron values present in the effluent from the oxidation reactor are merely returned to the reaction zone, there is efficient use of the boron values but the selectivity of the oxidation reaction to the desired products decreases rapidly. Indeed, so rapid is this decline in selectivity that, after as few as three or four such recycles, the selectivity becomes too low for continuance of the oxidation to be economically feasible.

It has been found that this decline in selectivity is due to the build-up of organic impurities which are preferentially associated with the boron compounds. These impurities are difficult to separate completely from the boron compounds and even the presence of a few percent of such impurities is sufficient to impair seriously the efficiency of the oxidation. The exact nature of these impurities is not fully known but, in the case of cyclohexane oxidation to produce cyclohexanol and cyclohexanone, identified impurities having a delterious effect upon the oxidation process include adipic acid, succinic acid, glutaric acid, and α-hydroxycaproic acid, and the like.

Various attempts to solve this problem have been proposed but they generally require the crystallization of the boron compound, e.g. boric acid, and a number of mechanical treating steps which are somewhat effective but all inherently involve the loss of boron values.

One proposal disclosed in British patent specification 1,036,206, for example, involves the purging of a portion of the aqueous stream containing the boron compounds and the addition of fresh boron compound as make-up in order to prevent the build-up of these impurities. This expedient, however, results in significant losses of the boron compounds and correspondingly increases the expense of operation of the process. Attempts to reduce the amount of boron compound purged from the system lead to greatly lowered oxidation reaction selectivity because the level of the deleterious impurities increases. Other proposals aimed at the solution of this problem have been made and are successful to varying degrees but in all cases there is still a substantial loss of boron values and there is a necessary effluent from the system containing the impurities of the character mentioned which must be eventually discarded or specially treated in some way. For example, it has been proposed that the boric acid filter cake remaining after hydrolysis of the borate esters produced in the oxidation product and crystallization of the hydrolysis product be washed with a solvent for the organic impurities as disclosed, for example, in British patent specification 1,197,472. While this expedient is reasonably effective, it adds a certain degree of complexity to the overall process and still results in unavoidable loss of boron values and in accumulated organic wastes. There thus still remains a three-fold problem of removing contaminating impurities from the hydrocarbon oxidation system, preventing undue loss of boron values, and minimizing the accumulation of organic wastes requiring separate treatment.

It is thus an object of this invention to provide an improved process for the oxidation of hydrocarbons in the presence of organic compounds which provides a solution to the foregoing problem.

It is a further object of the invention to provide an improved process of the character indicated which includes means for effective recovery of boron values and effective reduction of deleterious organic contaminates.

It is still another object of the invention to provide an integrated system for the oxidation of hydrocarbons in the presence of boron compounds wherein boron values are retained in the system and organic impurities are effectively removed to provide a process with maximum reuse of boron values while maintaining the selectivity and efficiency of the oxidation reaction.

Other objects of the invention will be apparent from the following detailed description of the invention and of illustrative embodiments thereof.

Before describing the improved process which is the subject matter of the invention and which fulfils the foregoing objects, it is believed advantageous to refer to a typical commercial process for the oxidation of hydrocarbons with molecular oxygen in the presence of boron compounds. Thus, in a representative operation, a hydrocarbon in liquid phase, together with a boron compound such as meta-boric acid, is charged to a reactor and contacted with a molecular oxygen-containing gas at reaction conditions until the desired conversion is obtained. Usually from 5 to 15% of the hydrocarbon is converted per pass, although higher or lower conversions can be obtained. Typical oxidation temperatures are in the range from about 150° C. to about 200° C. Typical pressures are from about atmospheric to 1000 p.s.i.g., depending, for example, on the hydrocarbon, preferably 100 p.s.i.g. to about 200 p.s.i.g. The preferred boron compounds employed in such oxidations are boric acids (ortho and meta boric acids) and boric acid anhydrides (e.g. $B_2O_3$ and $B_4O_5$). Mixtures of these boron compounds (as they are referred to hereinafter) can also be employed.

Suitable hydrocarbon feeds to the oxidation reaction are those saturated hydrocarbons having from 4 to and including 20 carbon atoms per molecule, including mixtures of such hydrocarbons. Thus, such feeds comprise aliphatic and alicyclic hydrocarbons such as, for example, cyclohexane, methyl cyclohexane, cycloheptane, cyclooctane, dimethyl cyclohexanes, n-pentane, n-hexane, methyl pentanes, methyl butanes, cyclododecane, eicosane, $C_{12}$ to $C_{14}$ petroleum naphthas, $C_{15}$ to $C_{18}$ petroleum naphthas, and the like.

At the present time the most widely practiced embodiment of the hydrocarbon oxidation reaction is the oxidation of cyclohexane to a mixture of cyclohexanol and cyclohexanone. The process of the invention will accordingly be described with particular reference to cyclohexane oxidation as an illustrative embodiment, but it is to be understood that the invention is in no way limited to this feed and is broadly applicable to any of the saturated hydrocarbon feeds of the type referred to above.

During the oxidation of the cyclohexane (or other hydrocarbon) the majority of the hydrocarbon oxidized is converted to a borate ester of the corresponding monofunctional alcohol and to a ketone. It is believed that, in the case of cyclohexane for example, cyclohexyl hydroperoxide is formed and then reacts with the boron compound to give a peroxyborate which, in turn, reacts with the alcohol to form cyclohexyl borate. Thus, when cyclohexane is oxidized the reactor effluent primarily contains unreacted cyclohexane, cyclohexyl borate, cyclohexanone, cyclohexyl peroxyborate or cyclohexyl hydroperoxide, and small amounts of the deleterious by-products or impurities of the type mentioned above.

Such mixtures of reaction products and unreacted feedstock are conveniently referred to as borate ester-containing hydrocarbon oxidation mixtures.

The typical borate ester-containing hydrocarbon oxidation mixture removed from the oxidation zone is hydrolyzed to convert the borate ester to the free alcohol and to liberate ortho-boric acid. The main oxygenated products are recovered as product and the boric acid is recovered for recycle to the hydrocarbon oxidation, for example by the systems disclosed in the above-mentioned patents, which involve crystallization of the boric acid liberated in the hydrolysis step.

In accordance with the invention, the by-product or impurity problem is effectively solved by integrating the boron compound cycle with a second oxidation step in an aqueous environment under controlled conditions. Advantageously, the second oxidation step follows the hydrolysis of the effluent from the first or primary oxidation step and the boric acid containing effluent from the second oxidation step is recycled to the system with at least part of this effluent being returned to the primary oxidation.

It is a feature of the invention that important economies in recovery of boron values and in impurity removal from the oxidation products can be realized.

It is another feature of the invention that the materials which are removed from the streams containing the boron values and which, in the past, have comprised a specified fraction of the stream removed as a purge, or an extract produced by solvent extraction of the boron compounds to remove organic impurities, all of which contain organic impurities which require ultimate disposition in some manner, are limited in accordance with the invention substantially to water and carbon dioxide.

It is a further feature of the invention that complicated boric acid crystallization and centrifuging or filtering operations are avoided.

It is still another feature of the invention that the process provided permits a high degree of flexibility with respect to the incorporation of the secondary oxidation into the overall system.

Other features of the invention having important technical and economical advantages over the prior art will be apparent as the description of the invention proceeds.

It is believed that a full understanding of the invention will be facilitated by reference to the schematic-flow diagram of an illustrative embodiment which is set forth in the accompanying drawing. Referring to the drawing, the hydrocarbon to be oxidized, e.g. cyclohexane, and a boron compound, e.g. meta-boric acid, are introduced into the primary oxidation zone 10 through line 12, and molecular oxygen-containing gas, preferably air, is introduced through a line 14. During the course of the oxidation in zone 10, hydrocarbon vapor, i.e. "boil up" and non-condensible gases are removed through vapor outlet line 16 for treatment to recover the hydrocarbon for recycling to the reaction zone 10, an operation which can be carried out in conventional manner, for example as disclosed in Marcell U.S. Pat. No. 3,317,614, and forms no part of the present invention. The liquid reaction mixture is withdrawn from the oxidation zone 10 through a liquid outlet line 18, and is introduced into a hydrolysis zone 20, to which water is added through a line 22. It is one of the features of this invention that the water for hydrolysis can be obtained from an aqueous phase produced in a later stage of the process so that maximum recovery of boron values can be achieved. As illustrated, a particularly suitable source of hydrolysis water is from the washing of the organic phase resulting from the hydrolysis and a further source is from the condensate from the secondary oxidation. In zone 20, the borate ester-containing hydrocarbon oxidation mixture produced in primary oxidation zone 10 is hydrolyzed to liberate the desired alcohol, e.g. cyclohexanol, when cyclohexane is the hydrocarbon oxidized in zone 10, as well as to liberate the boron values, generally in the form of ortho-boric acid. The thus-produced hydrolysis mixture is removed from hydrolysis zone 20 through a line 32 and is passed to decantation zone 34, wherein the mixture separates into an upper organic phase containing the unreacted hydrocarbon together with the desired alcohol and ketone products, as well as some of the by-product organic impurities, and into a lower aqueous phase, containing the boric acid and most of the organic impurities. It is a further important feature of the invention that the hydrolysis is suitably carried out at an elevated temperature, i.e. without substantial cooling of the oxidation mixture issuing from zone 10, so that the aqueous phase which separates in decantation zone 34 is also at an elevated temperature, which ensures high solubility of the boric acid and of the deleterious organic impurities produced as by-products in oxidation zone 10 and which present the serious problem discussed above. The upper organic phase is removed from decantation zone 34 through line 36. In order to ensure maximum recovery of boron values for recycling to the primary oxidation, and in order to achieve maximum removal of organic impurities from the product alkanol and alkanone, the organic phase from the decantation zone is preferably washed in a washer 37 with water, which is suitably supplied through a line 38, in order to remove at least some, and preferably most or all of the boric acid and by-product impurities which may be contained in the organic phase. A particularly suitable source of water for the washing operation is the condensate from heat exchanger 66. The washing may be carried out in one or more stages, as by countercurrent contact between the water and the organic phase, or by other conventional means. The washing water is advantageously heated to approximately the temperature of the organic phase in order to ensure maximum solubility. As previously mentioned, the effluent wash water containing the dissolved boric acid and organic impurities is suitably used in the hydrolysis step and is withdrawn from the washer through a line 39 which communicates with line 22. A portion of the wash water may be combined with the aqueous phase from decantation zone 34, as through a line 40.

The washed organic phase is withdrawn through a line 41 and can be treated in accordance with known procedures for the recovery of the desired alcohol and ketone products and for the recovery of unreacted hydrocarbon, which is advantageously recycled to primary oxidation zone 10. Such treatment of the organic phase to recover its components forms no part of the present invention and a typical treating system is shown, for example, in Russell et al., U.S. Pat. No. 3,438,726.

The lower aqueous phase in decantation zone 34, which contains dissolved boric acid as well as by-product impurities, is withdrawn from decantation zone 34 by means of outlet line 42. Since this aqueous phase will contain significant quantities of product alkanol and alkanone which will be lost if the aqueous phase is subjected directly to further oxidation. the aqueous phase is advantageously passed to a recovery zone 44 which is suitably a stripping zone wherein the aqueous phase is stripped, e.g. by means of steam, introduced through a line 45, and the effluent vapors containing alkanol and alkanone are removed through a line 46 for recovery of these products. This stripping step effectively removes substantially all of the alkanol and alkanone while leaving the undesired organic impurities behind. Alternatively, the aqueous phase can be subjected to countercurrent extraction with an alkane or cycloalkane, preferably the hydrocarbon subjected to oxidation in oxidation zone 10. The stripping or extracting are carried out in conventional manner and the particular method of stripping or extracting forms no part of this invention. From the stripping zone 44 the aqueous phase is withdrawn through line 47 and is heated by means of a heater or heat exchanger 48 and is then passed into second oxidation zone 50, the necessary flow being effected by means of a pump 52. Zone 50 is provided with heating means, indicated at 54, and with a vapor outlet line 58. The oxygen-containing gas may be supplied through inlet line 56 or it may be added to the system by mixing it with the aqueous feed to the secondary oxidation zone 50, as through line 57 which joins line 47 upstream of heater 48. The liquid effluent from oxidation zone 50 is withdrawn through a line 60. In the reaction which takes place in secondary oxidation zone 50, the organic materials contained in the aqueous phase charged to it are oxidized, substantially completely, to carbon dioxide and water, so that the aqueous stream withdrawn from secondary oxidation zone 50 is free of organic impurities or has, at most, a content of 1% by weight of such impurities, expressed as percent carbon per part of ortho-boric acid, and is essentially an aqueous solution of ortho-boric acid. A line 64 is provided for recycling part of the aqueous solution in line 60 to the oxidation zone 50, when desirable, and the gaseous effluent, entering line 58, which comprises nitrogen, residual oxygen, carbon dioxide, water vapor, and vaporized boron values, is passed through a heat exchanger 66 in order to condense the condensible components of the effluent, thereby producing essentially an aqueous boric acid solution, which is withdrawn through a line 68 and may be recycled to the secondary oxidation through line 70, or may be passed through a line 74 to be used as a washing agent in washer 37, or may be passed through a line 75 to hydrolysis zone 20 to provide some of the water for the hydrolysis reaction. Preferably, it is used as a washing agent in washing zone 37, supplemented by fresh water introduced through line 38. In any case, it will be seen that the boron values are retained in the system for ultimate reuse in primary oxidation zone 10, and are essentially free of the organic impurities produced in the primary oxidation. The non-condensed gases are removed from the system through line 72.

In order to recover the boron values, i.e. the boric acid, in the form which is most suitable for the oxidation which is carried out in primary oxidation zone 10, it is necessary to dehydrate the solution from line 60. This solution is, therefore, passed to a dehydration zone 76, and in some cases also to a dispersion zone 80 where a boric acid slurry is formed. Dehydration is effected in any convenient manner. The recovered boric acid, most suitably in the form of meta-boric acid, is then returned to the primary oxidation zone. The cycle of boron values is thus completed and the recycled boron compound enters the oxidation zone substantially free from organic impurities so that there is essentially no impairment of its activity in this oxidation.

As previously mentioned, the hydrolysis of the liquid reaction product from the primary oxidizer wherein the hydrocarbon is oxidized, and which comprises borate esters of the alcohol corresponding to the hydrocarbon oxidized, is preferably carried out substantially at the temperature of the oxidation zone, i.e. 140 to 180° C. without any purposeful cooling, although it can be carried out at temperatures in the range of about 100° to 250° C., under appropriate pressure to maintain the product and the hydrolyzing water in the liquid phase, e.g. pressures of about 25 p.s.i.g. to 900 p.s.i.g. The hydrolysis at these elevated temperatures, in contrast to conventional hydrolysis which is carried out after substantial cooling of the oxidizer reaction liquid, e.g. at 70 to 90° C., not only has the important economical advantage of making it possible to avoid the necessity of cooling and then reheating for the secondary oxidation step, but it also facilitates the passage of the undesired oxidation by-products into the aqueous phase of the hydrolysis effluent and thus effects an in situ purification of the organic phase containing the desired alkanol and alkanone, so that removal of these unwanted impurities is maximized. The amount of water used in the hydrolysis is not critical as long as there is sufficient water on a stoichiometric basis to effect the hydrolysis and to solubilize the boric acid. Preferably, however, excess water is employed and an excess of at least about 10% of the stoichiometric quantity is desirable but, in any case, sufficient water should be used to insure the solution of all of the boric acid liberated in the hydrolysis. Large excesses of water can be used but, since they must eventually be removed in the course of recovering the boron values, the limit of the excess will generally be governed by economic considerations.

As indicated above, desirable results are obtained if the organic phase is washed with water to remove from the organic phase at least some, and preferably most, of the boric acid and organic impurities which may still be contained in it, depending upon the solubility characteristics of the components of the organic phase. The amount of water used will depend upon the extent of washing desired, but ordinarily 0.02 to 1 part of water per part of organic phase is preferably employed. The resulting wash water may be added to the aqueous phase from the decantation and the mixture subjected to the secondary oxidation in accordance with the invention, but part of the wash water may be used as hydrolyzing agent in hydrolysis zone 20, by supplying it through line 22.

The solution formed in the hydrolysis reaction as an aqueous phase and separated by decantation or other convenient means from the organic phase, is as mentioned, then subjected to a secondary oxidation wherein the organic components of the solution, or at least most of them, are further oxidized predominantly to carbon dioxide and water to make possible the reuse of the boron values in the primary oxidation step without adverse effect.

Preferably, however, the thus-recovered aqueous phase is first stripped in zone 44 to recover from it product alkanol and alkanone, and it is then pumped under pressure, as by pumping means 52, through heater 48 into the secondary oxidizer, which is suitably constructed to withstand high pressures, for example, up to 200 atmospheres. The solution is introduced under the pressure which is to be employed for the oxidation. Air or any suitable gaseous mixture containing molecular oxygen is compressed and admitted to the oxidizer through line 56 or is combined with the liquid feed through line 57, as described above.

In carrying out the secondary oxidation step of the process of this invention, temperatures of about 150° to 350° C. are suitably employed. Higher or lower temperatures may be used but, in any case, the temperature is at least the ignition temperature of the organic impurities present in the solution being oxidized. In starting up, the reactor contents will need to be heated to the required reaction temperature, but once the oxidation begins the reaction will maintain itself. Such heating is suitably effected by means of heater 48, supplemented when desired by heating means 54. The admission of the air or other oxygen-containing gas initiates the oxidation of the combustible substances, and thereafter, the reaction is self-sustaining, ordinarily requiring no further external heat, as mentioned. However, if it ever becomes necessary, the application of external heat by heating means 54 or the injection of fuel values into the aqueous oxidizable materials being processed is readily effected. The pressure in the oxidizer is that required to maintain the desired oxidation temperature, e.g. a pressure of about 1000 to 3000 p.s.i.g. The oxygen-containing gas may be admitted through a single port at the bottom of the oxidizer but it may also be admitted through a dispersion head to effect intimate dispersion of the air through the solution. The oxygen-containing gas may even be admitted at additional points, if desired. It is advantageous to achieve a thorough dispersion or diffusion of the air throughout the solution to assure oxidation of each of the carbon-containing molecules or other combustible substance in the solution. A plurality of inter-connected oxidation zones may be employed if desired, only one being shown in the drawing. Thus, among the factors for initiating and maintaining the secondary oxidation are: applying to the aqueous solution a pressure sufficient to maintain part of the water in the liquid state, heating the charge to a temperature at which oxidation of the combustible substances will occur, and providing an adequate supply of gaseous oxidizing agent.

The amount of oxygen supplied, preferably in the form of a molecular oxygen-containing mixture, such as air, is suitably from 90% to 160% of that required to oxidize the organic impurities completely to water and carbon dioxide. The pressure and temperature are, as mentioned, sufficient to initiate the reaction but higher temperatures and higher pressures can be used. Indeed, the upper temperature limit is the critical temperature of steam. However, it is preferred to operate under conditions such that the temperature is maintained within the previously specified range of 150° to 350° C. Preferred conditions are temperatures of 200° to 320° C. and corresponding pressures within the range set forth above, and times of 5 to 60 minutes.

In order to recover any boric acid which may pass into the vapor effluent stream from the oxidizer, the vapor stream can be partially condensed in heat exchanger or waste heat boiler 66 and the resultant boric acid solution recycled to the inlet to the oxidizer. Alternatively, the condensate can be recycled to the hydrolysis step. Preferably, however, it is employed as wash water in washer 37, as already indicated.

An important feature of the process of this invention is that, following the pressure oxidation of the aqueous phase from the hydrolysis step in secondary oxidation zone 50, a number of possible routes are available for the recovery of the boric acid in a form which is suitably introduced into the primary oxidation zone 10. These possible steps all have a common denominator in that their purpose is to dehydrate the solution to produce solid boric acid, which is present in the solution in the form of ortho-boric acid, by removing the free water, and to convert at least part of the ortho-boric acid to meta-boric acid, or other less hydrated form, by removing at least some of the water bound in the boric acid molecule. Thus, the liquid effluent from the secondary oxidation can be heated at elevated temperatures and pressures to evaporate the solvent water and at least some of the bound water to produce the boric acid as a molten liquid. The molten boric acid which is obtained by the high temperature, high pressure dehydration in zone 76 can be withdrawn through line 78 and passed to a dispersion or mixing zone 80 where it can be dispersed in a liquid hydrocarbon, introduced through a line 82, as by spraying it into a vigorously-agitated body of the hydrocarbon, to produce a slurry or dispersion, which is then passed through a line 84 and combined with the hydrocarbon feed to primary oxidation zone 10. Alternatively, the molten boric acid can be directly introduced through line 86 into the primary oxidation zone 10, as by spraying. The molten boric acid may, on the other hand, first be converted to fine, solid particles by prilling, or like mechanical treatment, and the particles can then be slurried in the hydrocarbon in zone 80 prior to their return to the oxidation zone. In accordance with another alternative, the liquid effluent from dehydration zone 76 can be subjected to azeotropic distillation with a hydrocarbon corresponding to the hydrocarbon being fed to the primary oxidation zone. In this way, there is obtained is slurry of boric acid in the hydrocarbon which can be, at least in part, converted to meta-boric acid, as disclosed for example in U.S. Pat. 3,397,954. Whatever the method used to place the boric acid into a suitable form for introduction into the primary oxidation zone for oxidation of additional quantities of hydrocarbon, the boric acid is in a highly purified state and the oxidation reaction using the boric acid has the high selectivity which is characteristic of such oxidations carried out in the presence of boron compounds such as boric acid. It is readily possible to produce a recycled boric acid having, for example, a purity on a dry basis of at least 99%, and higher purities are readily obtained, e.g. 99.5%, i.e. the content of impurities is reduced to at most 1%, preferably 0.5%. The solution subjected to the secondary oxidation step will ordinarily contain 15% or more (dry basis) of organic impurities and this content can readily be reduced to the values indicated and can even be in essence completely eliminated, if desired. The more drastic the conditions, e.g., the greater the values of temperature, pressure, time and oxygen, the greater will be the reduction in the content of impurities. The preferred times of reaction, i.e., residence times, have been indicated but the reaction times can be less, e.g., as litle as 5 minutes, or they can be greater, if desired, depending upon the other conditions prevailing. The amount of oxygen supplied is, as mentioned, generally from 90% to 160% of that stoichiometrically required to oxidize the organic impurities completely to water and carbon dioxide, the 90% lower value being that which will generally insure a sufficiently pure boric acid for most uses and the upper limit being defined soley by economic considerations. Preferably, however, the amount of oxygen is at least 100% of the stoichiometric quantity but lesser amounts can be used if less pure boric acid is acceptable. It will thus be understood that the precise results realized will depend upon the specific initial content of organic impurities in the boric acid solution being handled and in the specific combination of conditions prevailing in the secondary oxidation zone. The specific combination of the indicated conditions to achieve a specific final organic impurity content is merely a matter of routine determination by persons skilled in the art. One of the advantages of the process is that all phases can be carried out continuously, but it will be understood that batch operation is also entirely suitable, if such is desired. In any case, the process of the invention makes it possible to operate with a recycled boric acid which can be essentially as fully effective as the original boric acid initially supplied to the system while at the same time there is minimum loss of boron values, and organic waste disposal problems are substantially eliminated.

The following examples of specific application will serve to give a fuller understanding of the invention but it will be understood that these examples are illustrative only and are not intended as limiting the invention. In the examples, all parts and percentages are by weight, unless otherwise indicated.

EXAMPLE I

Referring to the drawing, the primary oxidation zone 10 is charged with 3140 parts cyclohexane admixed with 81 parts meta-boric acid. Air is introduced through line 14 and the reactor is maintained at a temperature of 167° C. and at a pressure of 110 to 150 p.s.i.g. for 90 min. About 10% of the cyclohexane is reacted and the resultant borate-ester-containing liquid reaction mixture is withdrawn through line 18. A vapor stream consisting mainly of cyclohexane, nitrogen and water leaves the oxidation zone via line 16 for recovery of the cyclohexane for reuse. The liquid reaction mixture is passed to hydrolysis zone 20 via line 18 and about 147 parts of water are introduced through line 22. This water is in the form of a dilute boric acid solution removed from washing zone 37 through line 39. Hydrolysis water can, however, also be supplied in the form of condensate from heat exchanger 66, or from any convenient external source. The reaction mixture is hydrolyzed in zone 20 at a temperature of about 160° C. and at a pressure of about 190 p.s.i.g. The amount of water is sufficient to convert the borate esters to ortho-boric acid and to dissolve all of the boron values present under these conditions. The resulting mixture, containing 114 parts of ortho-boric acid, is passed via line 32 to decantation zone 34, in which an aqueous layer containing about 114 parts of water, 114 parts of ortho-boric acid, and some of the organic materials, is separated as a lower phase. The upper organic phase is passed via line 36 to washing zone 37 in which 150 parts of water are added via line 38 to wash the organic phase at 160° C. by countercurrent contact between the water and the organic phase. The condensate recovered from heat exchanger 66, and introduced through line 68, can also serve as a source of water for washing. The aqueous phase from the washing step is sent via lines 39 and 22 to hydrolysis zone 20. If desired some of it can be withdrawn through line 40 and mixed with the aqueous phase from decantation zone 34. The washed organic phase is withdrawn from washing zone 37 through line 41 for treatment to recover the product cyclohexanol and cyclohexanone and unreacted cyclohexane in conventional manner.

The aqueous layer from decantation section 34 is combined with aqueous phase from washing section 37 and the resulting mixture, containing 570 parts water, 114 parts of ortho-boric acid, and 31 parts of organic material, is passed via line 42 to alkanol stripping zone 44 wherein the dissolved cyclohexanol and cyclohexanone are substantially removed from the aqueous solution. The stripped aqueous boric acid solution is pumped to an elevated pressure (1650 p.s.i.g.) and passed to secondary oxidation section 50 via heat exchanger 48, suitably heated by steam. Air is passed via line 56 into the secondary oxidation zone, which is under a pressure of about 1600 p.s.i.g., and the organics are oxidized at about 315° C. practically completely to $CO_2$ and water in the course of about 20 minutes. The liquid stream of purified boric acid solution is withdrawn from the secondary oxidation zone 50 and part of the solution, e.g. 50%, may be recycled to the inlet of secondary oxidation via line 64. The hot effluent vapor from the secondary oxidation is sent via line 58 to heat exchanger 66. The liquid condensate recovered from heat exchanger 66 can be recycled to secondary oxidation via line 70, or to hydrolysis section via line 75, or to the washing zone via line 74.

The boric acid solution from the secondary oxidation zone containing about 114 parts of ortho-boric acid and about 76 parts of water and containing less than 1% (dry basis) organic material is heated in dehydration zone 76 under a pressure of 135 p.s.i.g. to about 220° C. to evaporate all the solvent water and to remove most of the bound water in the ortho-boric acid to yield a molten product consisting predominantly of meta-boric acid. The water vapor from the dehydration is vented but it can, if desired, be used for heating purposes at another point in the system. The molten boric acid from dehydration (about 81 parts) is withdrawn via line 78 and sprayed into 819 parts of liquid cyclohexane in an agitated slurry tank 80. A 9% slurry of dehydrated boric acid in cyclohexane is pased via line 84 to primary oxidation 10 for re-use and is fully effective.

EXAMPLE II

The procedure of Example I is repeated except that it is conducted in a continuous manner, the amount of fresh hydrocarbon feed through line 12 being sufficient to maintain a substantially constant level in oxidation zone 10, with continuous drawoff of some liquid reaction mixture through line 18, and continuous processing of the withdrawn mixture through the subsequent steps described in Example I. The dehydrated boric acid is continuously recycled to zone 10 and a smooth, fully effective and selective oxidation occurs, comparable to that realized with the procedure described in Example I.

EXAMPLE III

The procedure of Example I is repeated except that the secondary oxidation step is by-passed, i.e. the solution in line 47 is passed directly into dehydration zone 76. When the thus recovered dehydrated boric acid (containing more than 10% organic impurities) is supplied to oxidation zone 10 the reaction is adversely affected to the extent that the activity of the boric acid is essentially nullified so that the selectivity of the oxidation is not significantly different from what is would be if no boric acid were present.

EXAMPLE IV

Primary oxidation zone 10 is charged with 5590 parts cyclohexane admixed with 100 parts meta-boric acid. Air is introduced through line 14 and the reactor is maintained at a temperature of 165° C. and a pressure of about 110 p.s.i.g. for 80 min. About 7% of the cyclohexane is reacted and the resultant borate-ester-containing liquid reaction mixture is withdrawn through line 18. A vapor stream consisting mainly of cyclohexane, nitrogen and water leaves the oxidation zone via line 16 for recovery of the cyclohexane for reuse. The liquid reaction mixture is passed to hydrolysis zone 20 via line 18 and about 223 parts of water are introduced through line 22. This water is in the form of a dilute boric acid solution removed from washing zone 37 through line 39. The reaction mixture is hydrolyzed in zone 20 at a temperature of about 160° C. and at a pressure of about 195 p.s.i.g. The amount of water is sufficient to convert the borate esters to ortho-boric acid and to dissolve all of the boron values present under these conditions. The resulting mixture, containing 141 parts of ortho-boric acid, is passed via line 32 to decantation zone 34, in which an aqueous layer containing about 141 parts of water, 128 parts of orthoboric acid, and some of the organic materials, is separated as a lower phase. The upper organic phase is passed via line 36 to washing zone 37 in which 160 parts of water are added via line 38 to wash the organic phase at 160° C. by countercurrent contact between the water and the organic phase. The condensate recovered from heat exchanger 66, and introduced through line 68, can also serve as a source of water for washing. The aqueous phase from the washing step is sent via lines 39 and 22 to hydrolysis zone 20. If desired some of it can be withdrawn through line 40 and mixed with the aqueous phase from decantation zone 34. The washed organic phase is withdrawn from washing zone 37 through line 41 for treatment to recover the product cyclohexanol and cyclohexanone and unreacted cyclohexane in conventional manner.

The aqueous layer from decantation section 34 is combined with aqueous phase from washing section 37 and the resulting mixture, containing 520 parts water, 141 parts of ortho-boric acid, and 26 parts of organic material, is passed via line 42 to alkanol stripping zone 44 wherein the dissolved cyclohexanol and cyclohexanone are substantially removed from the aqueous solution. The stripped aqueous boric acid solution is pumped to an elevated pressure (1350 p.s.i.g.) and passed to secondary oxidation section 50 via heat exchanger 48, suitably heated by steam. Air is passed via line 57 into line 47 and then into the secondary oxidation zone, which is under a pressure of about 1300 p.s.i.g., and the organics are oxidized at about 300° C. practically completely to $CO_2$ and water in the course of about 30 min. The liquid stream of purified boric acid solution is withdrawn from the secondary oxidation zone and sent via line 60 to dehydratioin zone 76, and part of the solution, e.g. 50%, may be recycled to the inlet of the secondary oxidation zone via line 64.

The boric acid solution from the secondary oxidation zone, containing about 141 parts of ortho-boric acid and about 76 parts of water and containing less than 1% (dry basis) organic material is heated in dehydration zone 76 under a pressure of 135 p.s.i.g. to about 220° C. to evaporate all the solvent water and to remove most of the bound water in the ortho-boric acid to yield a molten product consisting predominantly of meta-boric acid. This molten boric acid from dehydration (about 100 parts) is withdrawn via line 86 and is sprayed directly into the liquid cyclohexane contained in primary oxidation zone 10 for re-use in a subsequent oxidation, and is fully effective and functions in essentially the same manner as the pure boric acid originally used.

EXAMPLE V

Primary oxidation zone 10 is charged with 7280 parts cyclohexane admixed with 150 parts meta-boric acid. Air is introduced through line 14 and the reactor is maintained at a temperature of 166° C. and at a pressure of about 115 p.s.i.g. for 85 min. About 8% of the cyclohexane is reacted and the resultant borate-ester-containing liquid reaction mixture is withdrawn through line 18. A vapor stream consisting mainly of cyclohexane, nitrogen and water leaves the oxidation zone via line 16 for recovery of the cyclohexane for reuse. The liquid reaction mixture is passed to hydrolysis zone 20 via line 18 and about 335 parts of water are introduced through line 22. This water is in the form of a dilute boric acid solution removed from washing zone 37 through line 39. The reaction mixture is hydrolyzed in zone 20 at a temperature of about 150° C. and at a pressure of about 155 p.s.i.g. The amount of water is sufficient to convert the borate esters to ortho-boric acid and to dissolve all of the boron values present under these conditions. The resulting mixture, containing 212 parts of ortho-boric acid, is passed via line 32 to decantation zone 34, in which an aqueous layer containing about 186 parts of water, 186 parts of ortho-boric acid, and some of the organic materials is separated as a lower phase. The upper organic phase is passed via line 36 to washing zone 37 in which 340 parts of water are added via line 38 to wash the organic phase at 150° C. by countercurrent contact between the water and the organic phase. The condensate recovered from heat exchanger 66, and introduced through line 68, can also serve as a source of water for washing. The aqueous phase from the washing step is sent via lines 39 and 22 to hydrolysis zone 20. If desired some of it can be withdrawn through line 40 and mixed with the aqueous phase from decantation zone 34. The washed organic phase is withdrawn from washing zone 37 through line 41 for treatment to recover the product cyclohexanol and cyclohexanone and unreacted cyclohexane in conventional manner.

The aqueous layer from decantation section 34 is combined with the aqueous phase from washing section 37 and the resulting mixture, containing 1040 parts water, 212 parts of ortho-boric acid, and 52 parts of organic material, is passed via line 42 to alkanol stripping zone 44 wherein the dissolved cyclohexanol and cyclohexanone are substantially removed from the aqueous solution. The stripped aqueous boric acid solution is pumped to an elevated pressure (1950 p.s.i.g.) and passed to secondary oxidation section 50 via heat exchanger 48, suitably heated by steam. Air is passed via line 56 into the secondary oxidation zone, which is under a pressure of about 1900 p.s.i.g., and the organics are oxidized at about 330° C. practically completely to $CO_2$ and water in the course of about 15 minutes. The liquid stream of purified boric acid solution containing about 212 parts of ortho-boric acid and about 212 parts of water and containing less than 0.5% (dry basis) organic material is withdrawn from the secondary oxidation zone and sent via line 60 to dehydration zone 76. In this embodiment the dehydration zone is divided into two divisions or stages, i.e. a primary stage and a secondary stage. The solution in line 60 enters the primary stage of the dehydration zone and then it passes to the secondary stage. In the primary stage the boric acid solution is contacted with the gases issuing from the secondary dehydration stage and in the secondary stage the solution is suitably contacted with the effluent vapors issuing from the primary oxidation zone 10 through vapor outlet line 16. Treatment in the primary stage with gases from the secondary dehydration stage effects the removal of at least some of the water present and the condensation of at least some of the cyclohexane contained in the hot gases, and in the secondary dehydration stage contact of the resulting liquid mixture with the gases issuing from oxidation zone 10, suitably cooled to about 155°–160° C., completes the dehydration and adds to the liquid cyclohexane present so that there is produced a slurry of meta-boric acid in cyclohexane. In this case, dispersion zone 80 is bypassed and the slurry is passed directly into line 84 and if required, additional quantities of liquid cyclohexane can be added, e.g. in either of the dehydration stages to improve fluidity. The recycled boric acid is fully effective in the oxidation and the adverse effect resulting from the use of boric acid contaminated with harmful quantities of organic impurities as illustrated in Example III is avoided. Indeed, the recycled boric acid is as fully effective as is fresh, pure boric acid.

Corresponding results are obtained when the first stage of the dehydration is effected by flashing or evaporating water from the solution at 180°–220° C. to provide a concentrated (e.g. 65–80%) solution of boric acid in water, and this solution is then contacted in the secondary dehydration stage with the partially-cooled vapors from line 16, and with enough liquid cyclohexane to insure fluidity, to provide a similar slurry of purified meta-boric acid in cyclohexane, e.g. a 1 to 30% slurry, for recycling to primary oxidation zone 10.

We claim:

1. In a process wherein saturated hydrocarbons having from 4 to 20 carbon atoms are oxidized with molecular oxygen in the presence of boric acid in a first oxidation zone, whereby to form an oxidation product comprising borate esters of the alcohol corresponding to the hydrocarbon oxidized, and the oxidation product is hydrolyzed to produce the free alcohol and boric acid, the steps which comprise:

(a) effecting the hydrolysis of the oxidation product with suffiicient water to hydrolyze the oxidation product and dissolve substantially all of the produced boric acid whereby to provide an aqueous phase which is a boric acid solution contaminated with by-product organic compounds formed in the oxidation zone, and an organic phase containing the alcohol,
(b) decanting the aqueous boric acid solution from the organic phase,
(c) introducing the decanted aqueous boric acid solution into a second oxidation zone which is separate from said first oxidation zone,
(d) oxidizing said decanted aqueous boric acid solution at a temperature of about 150° C. to about 350° C. under pressure in the liquid phase with molecular oxygen in said second oxidation zone to reduce the content of organic compounds therein,
(e) removing the oxidized solution from said second oxidation zone,
(f) dehydrating the oxidized solution to remove the free water therefrom and at least some of the water bound in the boric acid, and
(g) returning the dehydrated boric acid to said first oxidation zone.

2. A process as defined in claim 1, wherein the hydrolysis is effected at a temperature of 100° to 250° C.

3. A process as defined in claim 1, wherein the content of organic compounds is reduced in said second oxidation zone to at most 1% by weight, expressed as percent carbon per part of ortho-boric acid.

4. A process as defined in claim 1, wherein said decanted aqueous boric acid solution is oxidized under pressure at a temperature of 200° to 320° C.

5. A process as defined in claim 1, wherein product alcohol is at least partially removed from said decanted aqueous boric acid solution by stripping or solvent extraction before the solution is subjected to oxidation in said second oxidation zone.

6. A process as defined in claim 1, wherein said organic phase following decantation of the aqueous boric acid solution is washed with water and at least some of the resulting wash water is combined with said boric acid solution.

7. A process as defined in claim 1, wherein said organic phase following decantation of the aqueous boric acid solution is washed with water and at least some of the resulting wash water is combined with said boric acid solution.

8. A process as defined in claim 1, wherein said organic phase following decantation of the aqueous boric acid solution is washed with water and at least some of the resulting wash water is combined with said boric acid solution and at least some of said wash water is used to hydrolyze said oxidation product.

9. A process as defined in claim 1, wherein said organic phase following decantation of the aqueous boric acid solution is washed with water and at least some of the resulting wash water is used to hydrolyze said oxidation product.

9. A process as defined in claim 1, wherein the hydrocarbon is cyclohexane and the alcohol is cyclohexanol.

10. A process as defined in claim 1, wherein the dehydrated boric acid is directly introduced into said first oxidation zone.

References Cited
UNITED STATES PATENTS

| | | | |
|---|---|---|---|
| 3,651,153 | 3/1972 | Strauss et al. | 260—631 B |
| 3,456,021 | 7/1969 | Winnick et al. | 260—631 B |
| 3,232,704 | 2/1966 | Helbig et al. | 260—631 B |
| 3,287,423 | 11/1966 | Steeman et al. | 260—631 B |
| 3,316,302 | 4/1967 | Steeman et al. | 260—631 B |
| 3,475,500 | 10/1969 | Russell | 260—631 B |
| 3,420,897 | 1/1969 | Russell et al. | 260—631 B |

JOSEPH E. EVANS, Primary Examiner

U.S. Cl. X.R.

260—462 A, 536 B, 597 R, 610 B, 617 H, 639 B; 423—283